United States Patent
Tanaka

(10) Patent No.: US 12,021,262 B2
(45) Date of Patent: Jun. 25, 2024

(54) SLURRY COMPOSITION INCLUDING ORGANIC PARTICLES, SULFOSUCCINIC ACID ESTER, HYDROCARBON, AND WATER, ADHESIVE LAYER FORMED FROM THE SAME, SEPARATOR WITH ADHESIVE LAYER, AND NON-AQUEOUS SECONDARY BATTERY

(71) Applicant: ZEON CORPORATION, Tokyo (JP)

(72) Inventor: Keiichiro Tanaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 239 days.

(21) Appl. No.: 17/258,440

(22) PCT Filed: Jul. 12, 2019

(86) PCT No.: PCT/JP2019/027664
§ 371 (c)(1),
(2) Date: Jan. 7, 2021

(87) PCT Pub. No.: WO2020/031614
PCT Pub. Date: Feb. 13, 2020

(65) Prior Publication Data
US 2021/0296735 A1    Sep. 23, 2021

(30) Foreign Application Priority Data

Aug. 10, 2018 (JP) .................................. 2018-151778

(51) Int. Cl.
| | | |
|---|---|---|
| *H01M 50/46* | (2021.01) | |
| *H01M 50/403* | (2021.01) | |
| *H01M 50/411* | (2021.01) | |
| *H01M 50/443* | (2021.01) | |

(52) U.S. Cl.
CPC ....... *H01M 50/461* (2021.01); *H01M 50/403* (2021.01); *H01M 50/411* (2021.01); *H01M 50/443* (2021.01)

(58) Field of Classification Search
CPC . H01M 50/461; H01M 50/403; H01M 50/411
USPC ......................................... 429/144, 145, 254
See application file for complete search history.

(56) References Cited

U.S. PATENT DOCUMENTS

| | | | |
|---|---|---|---|
| 2014/0107275 A1 | 4/2014 | Taichi et al. | |
| 2018/0233783 A1* | 8/2018 | Shidomi | H01M 4/68 |
| 2021/0066691 A1* | 3/2021 | Asai | H01M 50/414 |

FOREIGN PATENT DOCUMENTS

| | | | | |
|---|---|---|---|---|
| CN | 107452923 A | 12/2017 | | |
| CN | 110462880 A | 11/2019 | | |
| EP | 3605654 A1 | 2/2020 | | |
| JP | 04093304 A | * 3/1992 | | |
| JP | 2977589 B2 | 11/1999 | | |
| JP | 2014160651 A | 9/2014 | | |
| JP | 2016048670 A | * 4/2016 | | |
| JP | 2016048670 A | 4/2016 | | |
| WO | 2012165578 A1 | 12/2012 | | |
| WO | 2016110894 A1 | 7/2016 | | |
| WO | WO-2018180811 A1 | * 10/2018 | ............... C08K 5/41 | |
| WO | WO-2019073820 A1 | * 4/2019 | ............ H01M 10/04 | |

OTHER PUBLICATIONS

United States Environmental Protection Agency, Provisional Peer-Reviewed Toxicity Values for White Mineral Oil, 2009, 1-32 (Year: 2009).*
Feb. 16, 2021, International Preliminary Report on Patentability issued in the International Patent Application No. PCT/JP2019/027664.
Sep. 10, 2019, International Search Report issued in the International Patent Application No. PCT/JP2019/027664.
Apr. 4, 2022, the Extended European Search Report issued by the European Patent Office in the corresponding European Patent Application No. 19848342.2.

* cited by examiner

*Primary Examiner* — Sean P Cullen
(74) *Attorney, Agent, or Firm* — KENJA IP LAW PC

(57) ABSTRACT

A slurry composition for a non-aqueous secondary battery adhesive layer contains organic particles, a sulfosuccinic acid ester or a salt thereof, a hydrocarbon having a molecular weight of 1,000 or less, and water.

7 Claims, No Drawings

SLURRY COMPOSITION INCLUDING ORGANIC PARTICLES, SULFOSUCCINIC ACID ESTER, HYDROCARBON, AND WATER, ADHESIVE LAYER FORMED FROM THE SAME, SEPARATOR WITH ADHESIVE LAYER, AND NON-AQUEOUS SECONDARY BATTERY

TECHNICAL FIELD

The present disclosure relates to a slurry composition for a non-aqueous secondary battery adhesive layer, an adhesive layer for a non-aqueous secondary battery, a separator for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. A secondary battery generally includes battery members such as a positive electrode, a negative electrode, and a separator that isolates the positive electrode and the negative electrode from each other and prevents short-circuiting between the positive and negative electrodes.

In recent years, the formulation of compositions used in formation of the battery members described above has been studied with the aim of further improving battery characteristics of secondary batteries, for example. In one example, Patent Literature (PTL) 1 proposes a binder composition for a lithium ion secondary battery that contains a particulate polymer, a water-soluble polymer, a sulfosuccinic acid ester or a salt thereof, and water. Features of the binder composition described in PTL 1 are that the proportional content of an acid group-containing monomer unit in the water-soluble polymer is 20 weight % to 70 weight % and that the proportional content of the sulfosuccinic acid ester or the salt thereof is 0.01 parts by weight to 10 parts by weight per 100 parts by weight, in total, of the particulate polymer and the water-soluble polymer. The binder composition described in PTL 1 makes it possible to provide a lithium ion secondary battery or the like having excellent cycle characteristics and low-temperature output characteristics.

CITATION LIST

Patent Literature

PTL 1: JP2014-160651A

SUMMARY

Technical Problem

The components contained in the conventional binder composition described in PTL 1 are components that improve cycle characteristics and low-temperature output characteristics of a secondary battery from the following perspectives. First, the particulate polymer forms point adhesion between adherends and can contribute to enhancing output characteristics of an obtained secondary battery. Moreover, the water-soluble polymer having a specific chemical composition can contribute to enhancing cycle characteristics of an obtained secondary battery by reducing precipitation of lithium ions in electrolyte solution. Furthermore, the specific amount of sulfosuccinic acid increases coatability of the binder composition and can contribute to enhancing output characteristics and cycle characteristics of an obtained secondary battery.

In recent years, there has been demand for providing secondary batteries with even higher output. For this reason, separators included in secondary batteries are required to have an attribute of being resistant to dielectric breakdown during application of high voltage (i.e., have excellent voltage resistance).

However, there is room for further improvement of the voltage resistance of a separator that is formed using the conventional binder composition described above.

Accordingly, one object of the present disclosure is to provide a slurry composition for a non-aqueous secondary battery adhesive layer that can provide a separator having excellent voltage resistance when the slurry composition for a non-aqueous secondary battery adhesive layer is adopted for forming an adhesive layer on a separator substrate.

Another object of the present disclosure is to provide an adhesive layer for a non-aqueous secondary battery that can improve voltage resistance of a separator.

Yet another object of the present disclosure is to provide a separator for a non-aqueous secondary battery and a non-aqueous secondary battery that have excellent voltage resistance.

Solution to Problem

The inventor conducted diligent investigation with the aim of solving the problem set forth above. The inventor reached a new finding that by compounding organic particles, sulfosuccinic acid ester or a salt thereof, and a low molecular weight hydrocarbon in production of a slurry composition, it is possible to noticeably increase voltage resistance of an obtained separator, and, in this manner, completed the present disclosure.

Specifically, the present disclosure aims to advantageously solve the problem set forth above, and a presently disclosed slurry composition for a non-aqueous secondary battery adhesive layer comprises: organic particles: a sulfosuccinic acid ester or a salt thereof: a hydrocarbon having a molecular weight of 1,000 or less; and water. Through a slurry composition having the chemical composition set forth above, it is possible to provide a separator having excellent voltage resistance when the slurry composition is adopted for forming an adhesive layer on a separator substrate.

Note that the "molecular weight" of the hydrocarbon refers to the "number-average molecular weight" and can be measured by a measurement method described in the EXAMPLES section.

In the presently disclosed slurry composition for a non-aqueous secondary battery adhesive layer, the hydrocarbon having a molecular weight of 1,000 or less is preferably a chain saturated hydrocarbon. Through a slurry composition that contains a chain saturated hydrocarbon as the hydrocarbon having a molecular weight of 1,000 or less, it is possible to provide a separator having even better voltage resistance.

In the presently disclosed slurry composition for a non-aqueous secondary battery adhesive layer, proportional content of the sulfosuccinic acid ester or the salt thereof is preferably not less than 0.5 parts by mass and not more than 18 parts by mass per 100 parts by mass of the organic particles. When the proportional content of the sulfosuccinic acid ester or the salt thereof per 100 parts by mass of the organic particles in the slurry composition is within the range set forth above in this manner, it is possible to provide a separator having even better voltage resistance and to provide a secondary battery having excellent cycle characteristics.

In the presently disclosed slurry composition for a non-aqueous secondary battery adhesive layer, proportional content of the sulfosuccinic acid ester or the salt thereof is preferably not less than 500 parts by mass and not more than 20,000 parts by mass per 100 parts by mass of the hydrocarbon having a molecular weight of 1,000 or less. When the proportional content of the sulfosuccinic acid ester or the salt thereof per 100 parts by mass of the hydrocarbon having a molecular weight of 1,000 or less in the slurry composition is within the range set forth above in this manner, it is possible to provide a separator having even better voltage resistance and process adhesiveness and to provide a secondary battery having even better cycle characteristics.

In the presently disclosed slurry composition for a non-aqueous secondary battery adhesive layer, proportional content of the hydrocarbon having a molecular weight of 1,000 or less is preferably not less than 0.01 parts by mass and not more than 1 part by mass per 100 parts by mass of the organic particles. When the proportional content of the hydrocarbon having a molecular weight of 1,000 or less per 100 parts by mass of the organic particles in the slurry composition is within the range set forth above in this manner, it is possible to provide a separator having even better voltage resistance and process adhesiveness.

Moreover, the present disclosure aims to advantageously solve the problem set forth above, and a presently disclosed method of producing an adhesive layer for a non-aqueous secondary battery comprises: applying any one of the slurry compositions for a non-aqueous secondary battery adhesive layer set forth above onto a separator substrate to form a coating film; and drying the coating film to obtain an adhesive layer. Through the presently disclosed production method that includes applying any one of the slurry compositions for a non-aqueous secondary battery adhesive layer set forth above onto a separator substrate to form a coating film in this manner, it is possible to efficiently provide a non-aqueous secondary battery adhesive layer that can improve voltage resistance of a separator.

Furthermore, the present disclosure aims to advantageously solve the problem set forth above, and a presently disclosed adhesive layer for a non-aqueous secondary battery is formed using any one of the slurry compositions for a non-aqueous secondary battery adhesive layer set forth above. The presently disclosed adhesive layer for a non-aqueous secondary battery set forth above can improve voltage resistance of a separator.

Also, the present disclosure aims to advantageously solve the problem set forth above, and a presently disclosed separator for a non-aqueous secondary battery comprises the presently disclosed adhesive layer for a non-aqueous secondary battery. The presently disclosed separator for a non-aqueous secondary battery set forth above has excellent voltage resistance.

Moreover, the present disclosure aims to advantageously solve the problem set forth above, and a presently disclosed non-aqueous secondary battery comprises the adhesive layer for a non-aqueous secondary battery set forth above. The presently disclosed non-aqueous secondary battery set forth above has excellent voltage resistance.

Advantageous Effect

According to the present disclosure, it is possible to provide a slurry composition for a non-aqueous secondary battery adhesive layer that can provide a separator having excellent voltage resistance when the slurry composition for a non-aqueous secondary battery adhesive layer is adopted for forming an adhesive layer on a separator substrate.

Moreover, according to the present disclosure, it is possible to provide an adhesive layer for a non-aqueous secondary battery that can improve voltage resistance of a separator.

Furthermore, according to the present disclosure, it is possible to provide a separator for a non-aqueous secondary battery and a non-aqueous secondary battery that have excellent voltage resistance.

DETAILED DESCRIPTION

The following provides a detailed description of embodiments of the present disclosure.

The presently disclosed slurry composition for a non-aqueous secondary battery adhesive layer can be used in formation of the presently disclosed adhesive layer for a non-aqueous secondary battery. Moreover, the presently disclosed adhesive layer for a non-aqueous secondary battery constitutes a separator together with a separator substrate and adheres the separator to another battery member such as an electrode. Furthermore, a feature of the presently disclosed separator for a non-aqueous secondary battery and the presently disclosed non-aqueous secondary battery is that they include the presently disclosed adhesive layer for a non-aqueous secondary battery.

(Slurry Composition for Non-Aqueous Secondary Battery Adhesive Layer)

A feature of the presently disclosed slurry composition for a non-aqueous secondary battery adhesive layer (hereinafter, also referred to simply as "the presently disclosed slurry composition") is that it contains organic particles, a sulfosuccinic acid ester or a salt thereof, a hydrocarbon having a molecular weight of 1,000 or less, and water. In addition, the presently disclosed slurry composition may optionally contain a binder, a leveling agent, other additives, and so forth.

Although it is not clear why a separator having excellent voltage resistance can be obtained in a situation in which the presently disclosed slurry composition satisfying the chemical composition set forth above is adopted for forming an adhesive layer on a separator substrate, the reason for this is presumed to be as follows.

Specifically, the sulfosuccinic acid ester or the salt thereof that is contained in the presently disclosed slurry composition can act to promote the hydrocarbon having a molecular weight of 1,000 or less entering pores of a microporous membrane to an appropriate degree when the slurry composition is applied onto a separator substrate formed of a microporous membrane in formation of an adhesive layer. It is presumed that through the hydrocarbon entering pores of the microporous membrane to an appropriate degree, electrical insulation of the overall separator can be increased.

<Organic Particles>

The organic particles are particles formed of a polymer that can display adhesive ability and/or blocking resistance ability, for example, in an adhesive layer. The organic particles can maintain a particulate form and be stably present in the slurry composition for an adhesive layer or in an electrolyte solution of a secondary battery. Note that one type of organic particles may be used individually, or two or more types of organic particles may be used in combination.

<<Structure of Organic Particles>>

The structure of the organic particles is not specifically limited. The organic particles may be particles formed of a non-composite polymer including substantially a single polymer component or may be particles formed of a composite polymer including a plurality of polymer components.

Examples of particles formed of a non-composite polymer include polyethylene particles, polystyrene particles, polydivinylbenzene particles, crosslinked styrene-divinylbenzene copolymer particles, polyimide particles, polyamide particles, polyamide imide particles, melamine resin particles, phenolic resin particles, benzoguanamine-formaldehyde condensate particles, polysulfone particles, polyacrylonitrile particles, polyaramid particles, polyacetal particles, and polymethyl methacrylate particles.

Particles formed of a composite polymer have a heterophase structure in which different polymer portions are present within the particles. In this context, a heterophase structure refers to a single particle formed by physical or chemical bonding of two or more different polymers, and not to a particle having a monophase structure formed from a single polymer such as a block polymer. Specific examples of heterophase structures include a core-shell structure including a core portion and a shell portion that at least partially covers the outer surface of the core portion: a side-by-side structure in which two or more polymers are disposed alongside one another: a snowman structure in which part of a polymer forming a central part in a core-shell structure is exposed at an outer shell; and an octopus ocellatus structure in which a spherical polymer particle has a particle of a different type of polymer embedded in the surface thereof to form a unified structure.

Of these examples, a polymer having a core-shell structure (hereinafter, also referred to simply as a "core-shell polymer") is preferable as the organic particles from a viewpoint of increasing blocking resistance of an adhesive layer. Note that the term "blocking resistance" refers to an attribute of being able to inhibit sticking together (i.e., blocking) of adjacent battery members via an adhesive layer during storage and transport of a battery member (i.e., a separator) that includes an adhesive layer. Also note that it is possible to confirm whether organic particles have a core-shell structure based on results of observing the cross-sectional structure of the organic particles.

[Organic Particles as Core-Shell Polymer]

In the case of organic particles that are a core-shell polymer, the organic particles include a core portion and a shell portion covering an outer surface of the core portion. However, it is preferable that the shell portion only partially covers the outer surface of the core portion. In other words, it is preferable that the shell portion of the organic particles that are a core-shell polymer covers the outer surface of the core portion but does not completely cover the outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion.

—Core Portion—

The polymer forming the core portion (hereinafter, also referred to as the "core polymer") is not specifically limited and may be a polymer obtained through polymerization of any monomers. Examples of monomers that can be used to produce the core polymer include vinyl chloride monomers such as vinyl chloride and vinylidene chloride: vinyl acetate monomers such as vinyl acetate: aromatic vinyl monomers such as styrene, α-methylstyrene, styrene sulfonic acid, butoxystyrene, and vinylnaphthalene: vinylamine monomers such as vinylamine: vinylamide monomers such as N-vinylformamide and N-vinylacetamide: acid group-containing monomers such as carboxy group-containing monomers, sulfo group-containing monomers, phosphate group-containing monomers, and hydroxy group-containing monomers; (meth)acrylic acid derivatives such as 2-hydroxyethyl methacrylate: (meth)acrylic acid ester monomers such as methyl acrylate, ethyl acrylate, methyl methacrylate, ethyl methacrylate, n-butyl acrylate, and 2-ethylhexyl acrylate: (meth)acrylamide monomers such as acrylamide and methacrylamide: (meth)acrylonitrile monomers such as acrylonitrile and methacrylonitrile: fluorine-containing (meth)acrylate monomers such as 2-(perfluorohexyl)ethyl methacrylate and 2-(perfluorobutyl)ethyl acrylate; maleimide monomer: maleimide derivatives such as phenylmaleimide; and diene monomers such as 1,3-butadiene and isoprene. One of these monomers may be used individually, or two or more of these monomers may be used in combination in a freely selected ratio.

Note that in the present disclosure, "(meth)acryl" is used to indicate "acryl" and/or "methacryl", "(meth)acrylo" is used to indicate "acrylo" and/or "methacrylo", and "(meth)acrylate" is used to indicate "acrylate" and/or "methacrylate".

Of the monomers described above, it is preferable that at least any one of an aromatic vinyl monomer, an acid group-containing monomer, a (meth)acrylic acid ester monomer, and a (meth)acrylonitrile monomer is used as a monomer in production of the core polymer. In other words, the core polymer preferably includes at least any one of an aromatic vinyl monomer unit, an acid group-containing monomer unit, a (meth)acrylic acid ester monomer unit, and a (meth)acrylonitrile monomer unit, and more preferably includes at least a (meth)acrylic acid ester monomer unit and an acid group-containing monomer unit. Of the examples given above, a styrene unit is preferable as an aromatic vinyl monomer unit, a methyl methacrylate unit and an n-butyl acrylate unit are preferable as a (meth)acrylic acid ester monomer unit, an acrylonitrile unit is preferable as a (meth)acrylonitrile monomer unit, and an acrylic acid unit is preferable as an acid group-containing monomer unit.

In addition, the core polymer may include a cross-linkable monomer unit. The cross-linkable monomer unit may, for example, be a unit that is derived from a polyfunctional monomer such as allyl methacrylate.

The phrase "includes a monomer unit" as used in the present disclosure means that "a polymer obtained with the monomer includes a repeating unit derived from the monomer".

Note that the proportional content of each unit in the core portion is preferably within a range described below when all repeating units included in the polymer forming the core portion are taken to be 100 mass %.

The proportional content of a (meth)acrylic acid ester monomer unit in the core portion is preferably not less than 50 mass % and not more than 99 mass %.

The proportional content of an acid group-containing monomer unit in the core portion is preferably not less than 0.1 mass % and not more than 5 mass %.

The proportional content of a cross-linkable monomer unit in the core portion is preferably not less than 0.1 mass % and not more than 5 mass %.

—Shell Portion—

The polymer forming the shell portion (hereinafter, also referred to as the "shell polymer") is not specifically limited and may be a polymer obtained through polymerization of any monomers. Specifically, examples of monomers that can be used in production of the shell polymer include the same monomers as given as examples of monomers that can be used in production of the core polymer. One of such monomers may be used individually, or two or more of such monomers may be used in combination in a freely selected ratio. In particular, the shell polymer preferably includes an aromatic vinyl monomer unit and an acid group-containing monomer unit.

The proportional content of an aromatic vinyl monomer unit in the shell portion is preferably not less than 50 mass % and less than 100 mass % when all repeating units included in the polymer forming the shell portion are taken to be 100 mass %. The proportion constituted by an acid group-containing monomer unit in the shell portion is preferably not less than 0.1 mass % and not more than 7 mass %.

<<Production Method of Organic Particles>>

No specific limitations are placed on the method by which the organic particles are produced. For example, the method of polymerization in production of organic particles as a non-composite polymer may be any of solution polymerization, suspension polymerization, bulk polymerization, and emulsion polymerization, for example. Moreover, the polymerization reaction may be addition polymerization such as ionic polymerization, radical polymerization, or living radical polymerization. The polymerization may be carried out with a commonly used emulsifier, dispersant, polymerization initiator, chain transfer agent, or the like, and the amount thereof may also be the same as commonly used.

Moreover, organic particles can be produced as a core-shell polymer, for example, by carrying out polymerization of monomer for the core polymer and monomer for the shell polymer in stages while changing the ratio of these monomers over time. Specifically, organic particles that are a core-shell polymer can be produced by continuous, multi-stage emulsion polymerization or multi-stage suspension polymerization in which a polymer produced in a preceding stage is sequentially covered by a polymer produced in a subsequent stage.

One example of a case in which organic particles that are a core-shell polymer are produced by multi-stage emulsion polymerization is a method described in WO2016/110894A1.

<<Properties of Organic Particles>>

In a case in which the organic particles are a non-composite polymer, the glass-transition temperature of the organic particles is preferably not lower than 50° C. and not higher than 100° C. When the glass-transition temperature of the organic particles is not lower than the lower limit set forth above, blocking resistance of an obtained separator can be further increased. Moreover, when the glass-transition temperature of the organic particles is not higher than the upper limit set forth above, adhesiveness as an adhesive layer can be sufficiently increased.

In a case in which the organic particles have a core-shell structure, the glass-transition temperature of the core portion is preferably not lower than 35° C. and not higher than 70° C., and the glass-transition temperature of the shell portion is preferably not lower than 80°C and not higher than 150° C. When these conditions are satisfied, it is possible to achieve a balance of high levels of sufficiently increasing adhesiveness as an adhesive layer and increasing blocking resistance of an obtained separator.

Note that the glass-transition temperature of the organic particles can be adjusted to a desired value based on the chemical composition in production thereof. Also note that the glass-transition temperature of the organic particles can be measured by a method described in the EXAMPLES section.

The degree of swelling in electrolyte solution of the organic particles is preferably not less than 100% and not more than 1,000%, more preferably not less than 100% and not more than 800%, and even more preferably not less than 200% and not more than 550%. When the degree of swelling in electrolyte solution of the organic particles is within any of the ranges set forth above, rate characteristics of an obtained secondary battery can be further enhanced. Note that the degree of swelling in electrolyte solution of the organic particles can be adjusted to a desired value based on the chemical composition in production thereof. Also note that the degree of swelling in electrolyte solution of the organic particles can be measured by a method described in the EXAMPLES section.

<Sulfosuccinic Acid Ester or Salt Thereof>

The sulfosuccinic acid ester is a monoester, diester, or triester of sulfosuccinic acid, is preferably a monoester or diester, and is more preferably a diester. Moreover, the sulfosuccinic acid ester is preferably a mono-, di-, or trialkyl ester, more preferably a monoalkyl ester or a dialkyl ester, and even more preferably a dialkyl ester.

More specifically, the sulfosuccinic acid ester or the salt thereof is preferably a compound represented by the following formula (i).

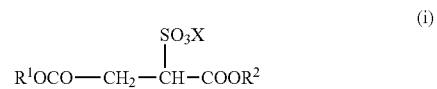

(i)

In formula (i), $R^1$ and $R^2$ are each, independently of each other, selected from the group consisting of Na, K, Li, $NH_4$, and an alkyl group having a carbon number of 1 to 12, and X is selected from the group consisting of Na, K, Li, $NH_4$. In a case in which $R^1$ and $R^2$ are each an alkyl group, the carbon number thereof is more preferably 1 to 12, and even more preferably 2 to 10. Moreover, in a case in which $R^1$ and $R^2$ are each an alkyl group, the alkyl group may be a linear alkyl group, a branched alkyl group, or an alkyl group including an alicyclic structure. Preferable examples of the alkyl group include an octyl group, a cyclohexyl group, a cyclopentyl group, and an amyl group. Of these alkyl groups, an octyl group, a cyclohexyl group, a cyclopentyl group, and an amyl group are particularly preferable, and an octyl group is most preferable.

In formula (i), X is preferably selected from the group consisting of Na, Li, and $NH_4$, and more preferably the group consisting of Na and Li. In a case in which $R^1$ and $R^2$ are each not an alkyl group, $R^1$ and $R^2$ are also preferably selected from the group consisting of Na and Li. Moreover, in a case in which $R^1$ and $R^2$ are each not an alkyl group, $R^1$ and $R^2$ are normally the same as X.

More specific examples of compounds represented by formula (i) include sodium salts, potassium salts, and ammonium salts of dioctyl sulfosuccinic acid, diamyl sulfosuccinic acid, and dicyclopentyl sulfosuccinic acid.

The proportional content of the sulfosuccinic acid ester or the salt thereof per 100 parts by mass of the organic particles in the presently disclosed slurry composition is preferably 0.5 parts by mass or more, more preferably 3.0 parts by mass or more, even more preferably 5.0 parts by mass or more, and particularly preferably 7.0 parts by mass or more, and is preferably 18 parts by mass or less, more preferably 13 parts by mass or less, and even more preferably 12 parts by mass or less. Note that in a case in which the presently disclosed slurry composition contains both a sulfosuccinic acid ester and a salt thereof, the proportional content mentioned above may be taken to be the total of the sulfosuccinic acid ester and the salt thereof as a proportion relative to the organic particles. When the proportional content of the sulfosuccinic acid ester or the salt thereof relative to the organic particles is not less than any of the lower limits set forth above, voltage resistance of an obtained separator can be further increased. Moreover, when the proportional content of the sulfosuccinic acid ester or the salt thereof relative to the organic particles is not more than any of the upper limits set forth above, cycle characteristics of an obtained secondary battery can be enhanced. This is presumed to be due to blocking of pores of a separator substrate by the hydrocarbon having a molecular weight of 1,000 or less becoming more difficult when the proportional content of the sulfosuccinic acid ester or the salt thereof is set as not more than any of the upper limits set forth above.

The proportional content of the sulfosuccinic acid ester or the salt thereof per 100 parts by mass of the subsequently described hydrocarbon having a molecular weight of 1,000 or less in the presently disclosed slurry composition is preferably 5,000 parts by mass or more, and more preferably 7,000 parts by mass or more, and is preferably 20,000 parts by mass or less, and more preferably 14,000 parts by mass or less. When the proportional content of the sulfosuccinic acid ester or the salt thereof based on 100 parts by mass of the hydrocarbon having a molecular weight of 1,000 or less satisfies any of the ranges set forth above in addition to the proportional content of the sulfosuccinic acid ester or the salt thereof and the proportional content of the hydrocarbon having a molecular weight of 1,000 or less based on 100 parts by mass of the organic particles satisfying any of the preferred ranges set forth above or described hereinafter, the following effects can be obtained. First, voltage resistance of an obtained separator can be further increased when the proportional content of the sulfosuccinic acid ester or the salt thereof relative to the hydrocarbon having a molecular weight of 1,000 or less is not less than any of the lower limits set forth above. In addition, process adhesiveness of an adhesive layer can be increased, and cycle characteristics of an obtained secondary battery can be enhanced when the proportional content of the sulfosuccinic acid ester or the salt thereof relative to the hydrocarbon having a molecular weight of 1,000 or less is not more than any of the upper limits set forth above. Note that the "process adhesiveness" of an adhesive layer refers to adhesiveness of the adhesive layer in a state before immersion in electrolyte solution. In other words, "process adhesiveness" refers to adhesiveness between battery members in a state before electrolyte solution is injected in a production process of a secondary battery.

<Hydrocarbon Having Molecular Weight of 1,000 or Less>

The hydrocarbon having a molecular weight of 1,000 or less functions to increase voltage resistance of a separator by entering pores of a separator substrate. Moreover, when the hydrocarbon having a molecular weight of 1,000 or less is present in a state adsorbed or attached to the surfaces of the organic particles, the hydrocarbon having a molecular weight of 1,000 or less can function to increase process adhesiveness of an adhesive layer by displaying plasticity.

The molecular weight (number-average molecular weight) of the hydrocarbon is required to be 1,000 or less, is preferably 550 or less, and preferably 500 or less, and is preferably 70 or more, more preferably 200 or more, and more preferably 250 or more. When the molecular weight of the hydrocarbon is within any of the ranges set forth above, it is possible to achieve a balance of increasing process adhesiveness of an obtained adhesive layer and increasing voltage resistance of an obtained separator. More specifically, a hydrocarbon having a molecular weight within any of the ranges set forth above can display a function like a plasticizer in an adhesive layer to thereby increase process adhesiveness of the adhesive layer. Moreover, an effect of improving voltage resistance of a separator through the hydrocarbon entering pores of a separator substrate can be further increased particularly in a case in which the molecular weight of the hydrocarbon is not less than any of the lower limits set forth above. Note that in a case in which the molecular weight of the hydrocarbon is not more than any of the upper limits set forth above, entry of the hydrocarbon into pores can be promoted when the slurry composition is applied onto a separator substrate, and thus voltage resistance of an obtained separator can be increased.

Any hydrocarbon can be used as the hydrocarbon without any specific limitations so long as the molecular weight thereof satisfies any of the ranges set forth above. Accordingly, the hydrocarbon having a molecular weight of 1,000 or less may be either of an aliphatic hydrocarbon or an aromatic hydrocarbon having a molecular weight of 1,000 or less. In particular, the hydrocarbon having a molecular weight of 1,000 or less is preferably a chain (linear or branched) saturated hydrocarbon having a molecular weight of 1,000 or less. Specific examples of chain saturated hydrocarbons having a molecular weight of 1,000 or less include octane, nonane, decane, and the like, as well as commercially available products such as the MORESCO® (MORESCO® is a registered trademark in Japan, other countries, or both) WHITE series produced by MORESCO® Corporation.

The proportional content of the hydrocarbon having a molecular weight of 1,000 or less per 100 parts by mass of the organic particles in the slurry composition is preferably 0.01 parts by mass or more, more preferably 0.03 parts by mass or more, and even more preferably 0.05 parts by mass or more, and is preferably 1 part by mass or less, more preferably 0.5 parts by mass or less, and even more preferably 0.2 parts by mass or less. When the proportional content of the hydrocarbon having a molecular weight of 1,000 or less per 100 parts by mass of the organic particles is not less than any of the lower limits set forth above, process adhesiveness of an adhesive layer can be increased, and voltage resistance of an obtained separator can be further increased. Moreover, when the proportional content of the hydrocarbon having a molecular weight of 1,000 or less per 100 parts by mass of the organic particles is not more than any of the upper limits set forth above, process adhesiveness of an adhesive layer can be increased.

<Binder>

The binder is a component formed of a polymer that, in an adhesive layer, has a function of strongly adhering battery members of a secondary battery (for example, a separator and an electrode) and that also prevents components in the adhesive layer, such as the previously described organic particles, from becoming detached from the adhesive layer.

<<Glass-Transition Temperature of Binder>>

The glass-transition temperature of a polymer forming the binder (hereinafter, also referred to as "the glass-transition temperature of the binder") is preferably lower than 50° C., more preferably 25° C. or lower, and even more preferably 15° C. or lower from a viewpoint of improving adhesiveness of an adhesive layer. Note that the lower limit of the glass-transition temperature of the binder is not specifically limited and can, for example, be set as −50° C. or higher. The glass-transition temperature of the binder can be adjusted by, for example, altering the types of monomers used in production of the polymer forming the binder.

Note that the "glass-transition temperature of a binder" can be measured by a method described in the EXAMPLES section.

<<Type of Binder>>

Any polymer can be used as the binder without any specific limitations so long as it is a polymer having adhesive ability. For example, a particulate polymer that can be dispersed in an aqueous medium can suitably be used. Specific examples of binders that can be used include diene polymers such as styrene-butadiene copolymer and acrylonitrile-butadiene copolymer, acrylic polymers, fluoropolymers, and silicon polymers. Of these binders, an acrylic polymer is preferable. One of these particulate polymers may be used individually, or two or more of these particulate polymers may be used in combination.

[Acrylic Polymer]

The acrylic polymer is a polymer that includes a (meth) acrylic acid ester monomer unit. In addition to a (meth) acrylic acid ester monomer unit, the acrylic polymer preferably includes an acid group-containing monomer unit, an aromatic vinyl monomer unit, and a cross-linkable monomer unit, for example. Note that the acrylic polymer may also include monomer units other than a (meth)acrylic acid ester monomer unit, an aromatic vinyl monomer unit, and a cross-linkable monomer unit (i.e., other monomer units).

—(Meth)Acrylic Acid Ester Monomer Unit—

Examples of (meth)acrylic acid ester monomers that can form a (meth)acrylic acid ester monomer unit of the acrylic polymer include the same (meth)acrylic acid ester monomers as previously described in the "Organic particles" section. One of these (meth)acrylic acid ester monomers may be used individually, or two or more of these (meth) acrylic acid ester monomers may be used in combination in a freely selected ratio. Of these (meth)acrylic acid ester monomers, 2-ethylhexyl acrylate is preferable.

The proportion constituted by a (meth)acrylic acid ester monomer unit in the acrylic polymer is preferably not less than 40 mass % and not more than 80 mass %.

—Acid Group-Containing Monomer Unit—

Examples of acid group-containing monomers that can form an acid group-containing monomer unit of the acrylic polymer include the same acid group-containing monomers as previously described in the "Organic particles" section. One of these acid group-containing monomers may be used individually, or two or more of these acid group-containing monomers may be used in combination in a freely selected ratio. Of these acid group-containing monomers, carboxy group-containing monomers are preferable, and acrylic acid is more preferable.

The proportion constituted by an acid group-containing monomer unit in the acrylic polymer is preferably not less than 1 mass % and not more than 10 mass %.

—Aromatic Vinyl Monomer Unit—

Examples of aromatic vinyl monomers that can form an aromatic vinyl monomer unit of the acrylic polymer include the same aromatic vinyl monomers as previously described in the "Organic particles" section. One of these aromatic vinyl monomers may be used individually, or two or more of these aromatic vinyl monomers may be used in combination in a freely selected ratio. Of these aromatic vinyl monomers, styrene is preferable.

The proportion constituted by an aromatic vinyl monomer unit in the acrylic polymer is preferably not less than 10 mass % and not more than 50 mass %.

—Cross-Linkable Monomer Unit—

Examples of cross-linkable monomers that can form a cross-linkable monomer unit of the acrylic polymer include the same cross-linkable monomers as previously described in the "Organic particles" section. One of these cross-linkable monomers may be used individually, or two or more of these cross-linkable monomers may be used in combination in a freely selected ratio. Of these cross-linkable monomers, allyl methacrylate is preferable.

The proportion constituted by a cross-linkable monomer unit in the acrylic polymer is preferably not less than 0.1 mass % and not more than 6 mass %.

—Other Monomer Units—

No specific limitations are placed on other monomers that can form other monomer units and examples thereof include the same monomers as described in the "Organic particles" section, exclusive of (meth)acrylic acid ester monomers, aromatic vinyl monomers, and cross-linkable monomers. One of these other monomers may be used individually, or two or more of these other monomers may be used in combination in a freely selected ratio.

<<Production Method of Binder>>

No specific limitations are placed on the method by which the binder is produced. For example, the method of polymerization in production of the binder may be any of solution polymerization, suspension polymerization, bulk polymerization, emulsion polymerization, etc. Moreover, the polymerization reaction may be addition polymerization such as ionic polymerization, radical polymerization, or living radical polymerization. The polymerization may be carried out with a commonly used emulsifier, dispersant, polymerization initiator, chain transfer agent, or the like, and the amount thereof may also be the same as commonly used.

<<Content of Binder>>

Although no specific limitations are placed on the content of the binder in the slurry composition, the content of the binder per 100 parts by mass of the organic particles is preferably 5 parts by mass or more, more preferably 10 parts by mass or more, and even more preferably 15 parts by mass or more, and is preferably 30 parts by mass or less, more preferably 27 parts by mass or less, and even more preferably 25 parts by mass or less. When the content of the binder is not less than any of the lower limits set forth above, adhesiveness of an adhesive layer can be improved. On the other hand, when the content of the binder is not more than any of the upper limits set forth above, internal resistance of an obtained secondary battery can be reduced.

<Leveling Agent>

The leveling agent is an optional component that is compounded in order to improve the smoothness of a coated surface obtained when the slurry composition is applied onto a separator substrate. The leveling agent is not specifically limited and can be any compound other than a sulfosuccinic acid ester or salt thereof that can display a surface active effect.

For example, a non-ionic surfactant can be used as the leveling agent. Examples of non-ionic surfactants that can be used include polyethylene glycol-based surfactants, polyoxyalkylene alkyl ether-based surfactants, polyol-based non-ionic surfactants, polyoxyethylene distyrenated phenyl ethers, polyoxyethylene tribenzyl phenyl ethers, and polyoxyalkylene alkyl ethers. One of these non-ionic surfactants may be used individually, or a plurality of these non-ionic surfactants may be used as a mixture. In particular, compounding of at least a polyethylene glycol-based surfactant as the leveling agent is preferable. The proportional content of the leveling agent in the slurry composition can, for example, be not less than 0.05 parts by mass and not more than 2.0 parts by mass per 100 parts by mass of the organic particles.

<Other Additives>

Examples of other additives that can be contained in the presently disclosed slurry composition include known additives such as viscosity modifiers and additives for electrolyte solution. Commonly known examples of such additives can be used without any specific limitations so long as they do not affect battery reactions. One of such additives may be used individually, or two or more of such additives may be used in combination.

<Production Method of Slurry Composition>

Although no specific limitations are placed on the method by which the slurry composition is produced, the slurry composition is normally produced by mixing the previously described organic particles, sulfosuccinic acid ester or salt thereof, hydrocarbon having a molecular weight of 1,000 or less, and other optional components in an aqueous medium. The method of mixing is not specifically limited, and the mixing can be performed using a known mixing device. The aqueous medium has water as a main solvent and may have a hydrophilic solvent other than water (for example, an alcohol) mixed therewith to the extent that a dissolved or dispersed state of each of the above-described components can be ensured. The proportional content of water as the "main solvent" when all solvent components contained in the slurry composition are taken to be 100 mass % can be more than 50 mass %, preferably more than 80 mass %, and more preferably more than 90 mass %.

Note that in a situation in which the organic particles are produced as a water dispersion, water that is used in production of the slurry composition may be water that was contained in the water dispersion of the organic particles.

<Surface Tension of Slurry Composition>

The surface tension of the slurry composition is preferably 30 mN/m or more, and more preferably 33 mN/m or more, and is preferably 45 mN/m or less, and more preferably 37 mN/m or less. When the surface tension of the slurry composition is not less than any of the lower limits set forth above, excessive entry of the hydrocarbon having a molecular weight of 1,000 or less into pores of a separator substrate can be inhibited, and cycle characteristics of an obtained secondary battery can be further enhanced. Moreover, when the surface tension of the slurry composition is not more than any of the upper limits set forth above, entry of the hydrocarbon having a molecular weight of 1,000 or less into pores of a separator substrate can be promoted to an appropriate degree, and voltage resistance of an obtained separator can be further increased.

Note that the surface tension of the slurry composition can be controlled by adjusting the amounts of the sulfosuccinic acid ester or the salt thereof, the leveling agent, the binder, and so forth.

(Adhesive Layer for Non-Aqueous Secondary Battery)

The presently disclosed adhesive layer for a non-aqueous secondary battery is formed using the slurry composition for a non-aqueous secondary battery adhesive layer set forth above. The adhesive layer for a non-aqueous secondary battery contains the previously described organic particles, sulfosuccinic acid ester or salt thereof, hydrocarbon having a molecular weight of 1,000 or less, and other optional components. Although the organic particles are in a particulate form in the slurry composition, the organic particles may have a particulate form or may have any other form in the adhesive layer formed using the slurry composition. The presently disclosed adhesive layer for a non-aqueous secondary battery can be used in production of the presently disclosed non-aqueous secondary battery. More specifically, the presently disclosed adhesive layer for a non-aqueous secondary battery is adopted with respect to a separator substrate and is used to adhere the presently disclosed separator, obtained by forming the adhesive layer on the separator substrate, to another battery member such as an electrode. The presently disclosed adhesive layer for a non-aqueous secondary battery has excellent voltage resistance as a result of containing the previously described organic particles, sulfosuccinic acid ester or salt thereof, and hydrocarbon having a molecular weight of 1,000 or less.

Note that in a case in which a polymer forming the organic particles or the like includes a cross-linkable monomer unit, the polymer may be cross-linked during drying of the slurry composition or during heat treatment or the like that is optionally performed after drying (i.e., the adhesive layer may contain a cross-linked product of the organic particles or the like).

<Substrate>

The separator substrate onto which the slurry composition is applied is not specifically limited and may be a known separator substrate such as an organic separator substrate. The organic separator substrate is a porous member that is formed of an organic material. The organic separator substrate may, for example, be a microporous membrane or non-woven fabric containing a polyolefin resin such as polyethylene or polypropylene, or an aromatic polyamide resin. In particular, the organic material forming the separator substrate is preferably polyethylene or polypropylene.

The porosity of the separator substrate is preferably 40% or more, more preferably 45% or more, and even more preferably 47% or more, and is preferably 60% or less, more preferably 55% or less, and even more preferably 53% or less. When the porosity of the separator substrate is within any of the ranges set forth above, voltage resistance can be effectively improved through the presently disclosed slurry composition. Note that the porosity of a separator substrate can be measured by a method described in the EXAMPLES section.

The thickness of the separator substrate is preferably 5 μm or more, more preferably 6 μm or more, and even more preferably 7 μm or more, and is preferably 16 μm or less, more preferably 14 μm or less, and even more preferably 12 μm or less. When the thickness of the separator substrate is within any of the ranges set forth above, voltage resistance can be effectively improved through the presently disclosed slurry composition.

The thickness of the adhesive layer is preferably not less than 0.3 μm and not more than 5 μm. When the thickness of the adhesive layer is 0.3 μm or more, voltage resistance and adhesiveness of a separator can be increased. Moreover, when the thickness of the adhesive layer is 5 μm or less, battery characteristics (particularly output characteristics) of a secondary battery can be improved.

<Production Method of Adhesive Layer for Non-Aqueous Secondary Battery>

The presently disclosed adhesive layer for a non-aqueous secondary battery can be produced, for example, through a step (1) of applying the slurry composition for a non-aqueous secondary battery adhesive layer set forth above onto a separator substrate to form a coating film and a step (2) of drying the obtained coating film to obtain an adhesive layer. This production method enables efficient production of the presently disclosed adhesive layer having excellent voltage resistance.

In step (1), the slurry composition is applied onto a separator substrate to form a coating film. It is preferable that the slurry composition is directly applied onto the separator substrate in step (1). The method by which the slurry composition is applied onto the separator substrate can be doctor blading, reverse roll coating, direct roll coating, gravure coating, extrusion coating, brush coating, or the like without any specific limitations.

In step (2), the coating film is dried to obtain an adhesive layer. Commonly known methods can be adopted as the drying method without any specific limitations. Specific examples of drying methods include drying by warm, hot, or low-humidity air, drying in a vacuum, and drying through irradiation with infrared light, electron beams, or the like. Although no specific limitations are placed on the drying conditions, the drying temperature is preferably 40° C. to 150° C. and the drying time is preferably 30 seconds to 30 minutes.

<Separator for Non-Aqueous Secondary Battery>

The presently disclosed separator for a non-aqueous secondary battery (hereinafter, also referred to simply as "the presently disclosed separator") includes a separator substrate and the presently disclosed adhesive layer for a non-aqueous secondary battery. The adhesive layer is preferably disposed directly on the surface of the separator substrate without another layer in-between. The separator substrate may be the same as any of the separator substrates described in the "Adhesive layer for non-aqueous secondary battery" section. The presently disclosed separator can be formed by applying the presently disclosed slurry composition set forth above onto the substrate and then drying the slurry composition. The presently disclosed separator for a non-aqueous secondary battery has excellent voltage resistance as a result of being obtained by forming the presently disclosed adhesive layer containing the previously described organic particles, sulfosuccinic acid ester or salt thereof, and hydrocarbon having a molecular weight of 1,000 or less on a separator substrate.

(Non-Aqueous Secondary Battery)

A feature of the presently disclosed non-aqueous secondary battery is that it includes the adhesive layer for a non-aqueous secondary battery set forth above. In particular, a feature of the presently disclosed non-aqueous secondary battery is that battery members thereof (i.e., the presently disclosed separator and an electrode) are adhered via the presently disclosed adhesive layer for a non-aqueous secondary battery. The presently disclosed non-aqueous secondary battery has excellent voltage resistance.

More specifically, the presently disclosed non-aqueous secondary battery includes a positive electrode, a negative electrode, a separator, and an electrolyte solution, for example, and has the adhesive layer for a non-aqueous secondary battery set forth above constituting at least one surface of the separator. In the presently disclosed non-aqueous secondary battery, the positive electrode and the separator and/or the negative electrode and the separator are joined through adhesion thereof via the adhesive layer for a non-aqueous secondary battery.

Note that known positive electrodes, negative electrodes, separators, and electrolyte solutions that are used in non-aqueous secondary batteries can be used as the aforementioned positive electrode, negative electrode, separator, and electrolyte solution.

Specifically, an electrode that is obtained by forming an electrode mixed material layer on a current collector can be used as an electrode (positive electrode or negative electrode). The current collector may be formed of a metal material such as iron, copper, aluminum, nickel, stainless steel, titanium, tantalum, gold, or platinum. Of these metal materials, a current collector formed of copper is preferable as a current collector for the negative electrode. Moreover, a current collector formed of aluminum is preferable as a current collector for the positive electrode. The electrode mixed material layer can be a layer containing an electrode active material and a binder.

The electrolyte solution is normally an organic electrolyte solution obtained by dissolving a supporting electrolyte in an organic solvent. For example, when the non-aqueous secondary battery is a lithium ion secondary battery, a lithium salt is used as the supporting electrolyte. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents in the case of a lithium ion secondary battery, for example, include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate: ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed non-aqueous secondary battery may be produced, for example, by stacking the positive electrode and the negative electrode with the separator in-between, performing rolling, folding, or the like of the resultant laminate as necessary in accordance with the battery shape, placing the laminate in a battery container, injecting the electrolyte solution into the battery container, and sealing the battery container. In order to prevent pressure increase inside the non-aqueous secondary battery and occurrence of overcharging or overdischarging, an overcurrent preventing device such as a fuse or a PTC device, an expanded metal, or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a structural unit that is formed through polymerization of a given monomer is normally, unless otherwise specified, the same as the ratio (charging ratio) of the given monomer among all monomers used in polymerization of the polymer.

In the examples and comparative examples, the degree of swelling in electrolyte solution of organic particles, the glass-transition temperature of each type of polymer, the molecular weight of a hydrocarbon, the surface tension of a slurry composition, the porosity of a separator substrate, the voltage resistance of a separator, the process adhesiveness of an adhesive layer, and the cycle characteristics of a secondary battery were measured or evaluated as follows.

<Degree of Swelling in Electrolyte Solution of Organic Particles>

A water dispersion containing organic particles that was produced in each example or comparative example was loaded into a petri dish made from polytetrafluoroethylene and was dried under conditions of 25° C. for 48 hours to produce a film of 0.5 mm in thickness. A 1 cm square was cut out from the film to obtain a test specimen. The mass of this test specimen was measured and was taken to be W0. The test specimen was immersed in electrolyte solution at 60° C. for 72 hours. Thereafter, the test specimen was removed from the electrolyte solution, electrolyte solution on the surface of the test specimen was wiped off, and the mass W1 of the test specimen after the immersion test was measured. Note that the electrolyte solution was a solution obtained by dissolving $LiPF_6$ as a supporting electrolyte in a concentration of 1 mol/L in a mixed solvent of ethylene carbonate, diethyl carbonate, and vinylene carbonate (volume mixing ratio: ethylene carbonate/diethyl carbonate/vinylene carbonate=68.5/30/1.5; SP value: 12.7 (cal/$cm^3)^{1/2}$).

The degree of swelling S (%) was calculated using the masses W0 and W1 by: S=W1/W0×100.

(Glass-Transition Temperature)

The glass-transition temperatures of organic particles and binders were measured as follows depending on the structure thereof.

<Binder>

In the case of a binder, a water dispersion containing the binder was prepared, and this water dispersion was dried to obtain a measurement sample. After weighing 10 mg of the measurement sample into an aluminum pan, the measurement sample was measured by a differential scanning calorimeter (EXSTAR DSC6220 produced by SII NanoTechnology Inc.) under conditions prescribed by JIS Z 8703 with a measurement temperature range of −100° C. to 500° C. and a heating rate of 10° C./min to obtain a differential scanning calorimetry (DSC) curve. Note that an empty aluminum pan was used as a reference. In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature)(° C.).

<Organic Particles (Core-Shell Polymer)>

In the case of a core polymer and a shell polymer of a core-shell polymer used as organic particles, water dispersions containing the polymers (core polymer and shell polymer) were first produced under the same polymerization conditions as for the core portion and the shell portion using the monomers, various additives, and so forth used in formation of the core portion and the shell portion. The produced water dispersions were dried to obtain measurement samples. Next, the glass-transition temperature (C) of the core polymer and the glass-transition temperature (° C.) of the shell polymer were determined in the same way as described above for a non-composite polymer.

(Molecular Weight of Hydrocarbon)

The molecular weight distribution and number-average molecular weight (Mn) according to gel permeation chromatography (GPC) for each hydrocarbon used in the examples and comparative examples were measured with respect to tetrahydrofuran (THF) soluble content of a measurement sample by GPC (gel permeation chromatography) with THF as a solvent. The measurement conditions were as follows.

(1) Preparation of Measurement Sample

A hydrocarbon (sample) and THF were mixed with a concentration of 5 mg/mL, were left at room temperature for 5 to 6 hours, and were then sufficiently shaken to thoroughly mix the THF and the sample until coalescence of the sample disappeared. The mixture was then left to settle for at least 12 hours at room temperature. Note that the time was adjusted such that the time taken from the point at which mixing of the sample and THF started to the point at which the settling ended was at least 24 hours.

Thereafter, the mixture was passed through a sample treatment filter (pore size: 0.45 μm to 0.5 μm; Myshori Disk H-25-2 [produced by Tosoh Corporation]) to obtain a GPC sample.

(2) Sample Measurement

A column was stabilized in a 40° C. heat chamber and then THF as a solvent was passed through the column at a flow rate of 1 mL/min with the column at this temperature, and 200 μL of a THF sample solution of the hydrocarbon that had been adjusted to a sample concentration of 5 mg/mL was injection into the column and was measured.

In molecular weight measurement of the sample, the molecular weight distribution of the sample was calculated from a relationship between a count value and a logarithmic value of a calibration curve prepared using a number of types of monodisperse polystyrene standard materials.

The standard polystyrene samples used to prepare the calibration curve were standard polystyrene samples having molecular weights of $6\times10^2$, $2.1\times10^3$, $4\times10^3$, $1.75\times10^4$, $5.1\times10^4$, $1.1\times10^5$, $3.9\times10^5$, $8.6\times10^5$, $2\times10^6$, and $4.48\times10^6$ that were produced by Pressure Chemical Co. or Toyo Soda Manufacturing Co., Ltd. An RI (refractive index) detector was used as a detector.

Note that a plurality of commercially available polystyrene gel columns were combined as a column as described below in order to enable precise measurement of a molecular weight region of $1×10^3$ to $2×10^6$. The GPC measurement conditions were as shown below.

[GPC Measurement Conditions]

Apparatus: LC-GPC 150C (produced by Waters Corporation)

Column: KF801, 802, 803, 804, 805, 806, 807 ("Shodex", produced by Showa denko K.K.); series of 7 columns Column temperature: 40° C.

Mobile phase: THF (tetrahydrofuran)

(Surface Tension)

The surface tension of a slurry composition for a non-aqueous secondary battery adhesive layer produced in each example or comparative example was measured by the platinum plate method using an automatic surface tensiometer (DY-300 produced by Kyowa Interface Science Co., Ltd.).

(Porosity of Separator Substrate)

A 10 cm×10 cm square sample was cut out from a microporous membrane, the volume (cm$^3$) and mass (g) thereof were determined, and then the porosity was calculated from the determined volume and mass and from the density of polyethylene (0.95 g/cm$^3$) using the following formula.

Porosity (%)=(Volume−Mass/Density of polyethylene)/Volume×100

(Voltage Resistance)

The voltage resistance of a separator produced in each example or comparative example was evaluated by the following procedure using an impulse tester model IMP-3090 produced by Nippon Technart Inc. First, a cut out separator sample of 50 mm×50 mm was sandwiched between electrodes (chrome-plated iron) of 30 mm in diameter, and application of voltage to the electrodes was initiated. The voltage value started at 0.1 kV and increased in increments of 0.05 kV. Voltage application was continued until finally dielectric breakdown (i.e., a voltage drop) was detected. The voltage at which the voltage drop was detected was taken as a voltage resistance value. This test was performed for 10 separator samples, and an average value of the determined voltage resistance values was taken as a measurement value. The measurement value was evaluated by the following standard to obtain a grade for voltage resistance of the separator.

A (excellent): 1.7 kV or more

B (good): Not less than 1.0 kV and less than 1.7 kV

C (permissible): Less than 1.0 kV (Process Adhesiveness)

A positive electrode, a negative electrode, and a separator produced in each example or comparative example were cut out with a width of 10 mm and a length of 50 mm. Next, a cut-out positive electrode and separator were stacked, a cut-out negative electrode and separator were stacked, and the resultant laminates were pressed at 10 m/min by roll pressing with a pressure equivalent to a load of 1 MPa and a temperature of 80° C. to obtain test specimens. Each of the test specimens was placed with the surface at the current collector side of the electrode (positive electrode or negative electrode) facing downward, and cellophane tape was affixed to the surface of the electrode. Tape prescribed by JIS Z1522 was used as the cellophane tape. Moreover, the cellophane tape was secured to a horizontal test stage in advance. The stress was measured when the separator substrate was peeled off by pulling one end of the separator substrate vertically upward at a pulling speed of 50 mm/min. This measurement was performed three times for laminates including a positive electrode and a separator and three times for laminates including a negative electrode and a separator (i.e., six times in total). An average value of the stress was determined as the peel strength, and then adhesiveness of an electrode and a separator was evaluated by the following standard. A larger peel strength indicates that an adhesive layer has higher process adhesiveness (adhesiveness in a state not immersed in electrolyte solution).

A: Peel strength of 5 N/m or more

B: Peel strength of not less than 3 N/m and less than 5 N/m

C: Peel strength of less than 3 N/m (Cycle Characteristics)

A produced lithium ion secondary battery was subjected to 200 cycles of charging and discharging in which the lithium ion secondary battery was charged to 4.2 V with a 1.5 C constant current, was then charged with a constant voltage until the current reached 0.02 C, and was subsequently discharged to 3.0 V. This charging and discharging was performed in an atmosphere having a temperature of 45° C. A charge/discharge capacity maintenance rate expressed by the ratio of the electric capacity at the end of 200 cycles and the electric capacity at the end of 5 cycles (=(electric capacity at end of 200 cycles/electric capacity at end of 5 cycles)×100(%)) was determined. Note that these measurements were performed for 5 lithium ion secondary battery cells, and an average value of the charge/discharge capacity maintenance rates of the cells was taken to be a charge/discharge capacity retention rate and was evaluated by the following standard. A larger value indicates better cycle characteristics.

A: Charge/discharge capacity retention rate of 95% or more

B: Charge/discharge capacity retention rate of not less than 90% and less than 95%

C: Charge/discharge capacity retention rate of less than 90%

Example 1

<Production of Organic Particles>

A 5 MPa pressure-resistant vessel equipped with a stirrer was charged with 53 parts of methyl methacrylate, 45 parts of butyl acrylate, 1 part of methacrylic acid, and 1 part of allyl methacrylate as a monomer composition for core portion production: 1 part of sodium dodecylbenzenesulfonate as an emulsifier: 150 parts of deionized water; and 0.5 parts of potassium persulfate as a polymerization initiator. These materials were sufficiently stirred and were then heated to 60°C to initiate polymerization. Polymerization was continued until a polymerization conversion rate of 96% was reached to yield a water dispersion containing a particulate polymer forming a core portion.

The water dispersion was then heated to 70° C. Next, 99 parts of styrene and 1 part of methacrylic acid as a monomer composition for shell portion production were continuously added to the water dispersion over 30 minutes, and polymerization was continued. When the polymerization conversion rate reached 96%, the reaction was quenched by cooling to produce a water dispersion containing organic particles that were a core-shell polymer. The organic particles produced by this procedure were confirmed to be a core-shell structure in which a shell portion partially covered an outer surface of a core portion.

<Production of Binder>

A reactor including a stirrer was charged with 70 parts of deionized water, 0.15 parts of sodium lauryl sulfate (produced by Kao Corporation; product name: EMAL 2F) as an emulsifier, and 0.5 parts of ammonium persulfate, the gas phase was purged with nitrogen gas, and heating was performed to 60° C. Meanwhile, a monomer mixture was obtained in a separate vessel by mixing 50 parts of deionized water, 0.5 parts of sodium dodecylbenzenesulfonate as a dispersant, and 65 parts of 2-ethylhexyl acrylate, 30 parts of styrene, 4 parts of acrylic acid, and 1 part of allyl methacrylate as polymerizable monomers. The monomer mixture was continuously added to the reactor over 4 hours to carry out polymerization. The reaction was carried out at 60° C. during the addition. After completion of the addition, a further 3 hours of stirring was performed at 70° C. to complete the reaction and thereby produce a water dispersion containing an acrylic polymer as a binder. The acrylic polymer had a glass-transition temperature of −10° C. as measured by the previously described method.

<Production of Slurry Composition for Non-Aqueous Secondary Battery Adhesive Layer>

A slurry composition for an adhesive layer having a solid content concentration of 15% was produced by mixing 0.1 parts of MORESCO® WHITE P-350P (produced by MORESCO® Corporation; number-average molecular weight: 483), which is a chain saturated hydrocarbon, as a hydrocarbon having a molecular weight of 1,000 or less, 100 parts (in terms of solid content) of the above-described water dispersion of the organic particles, 15 parts (in terms of solid content) of the above-described water dispersion of the binder, 0.15 parts of a polyethylene glycol-based surfactant (produced by San Nopco Limited; product name: SN WET 366) as a leveling agent, 10 parts of sodium dioctyl sulfosuccinate, and water for solid content adjustment. The surface tension of the obtained slurry composition was measured as previously described.

<Production of Separator>

A separator substrate made of polyethylene (thickness: 7 μm: porosity; 48%) was prepared as a separator substrate. The obtained slurry composition for an adhesive layer was applied onto one side of the separator substrate and was then dried at 50° C. for 10 minutes. This operation was also performed with respect to the opposite side of the separator substrate to form adhesive layers (thickness: 1 μm) at both sides of the separator substrate. The voltage resistance of the separator having adhesive layers at both sides that was obtained in this manner was evaluated as previously described. Moreover, the process adhesiveness of the formed adhesive layers was evaluated as previously described.

<Production of Binder for Negative Electrode>

A 5 MPa pressure-resistant vessel equipped with a stirrer was charged with 33.5 parts of 1,3-butadiene, 3.5 parts of itaconic acid, 62 parts of styrene, acrylate, parts 1 part of 2-hydroxyethyl 0.4 of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The reaction was quenched by cooling at the point at which the polymerization conversion rate reached 96% to yield a mixture containing a particulate binder (SBR). The mixture containing the particulate binder was adjusted to pH 8 through addition of 5% sodium hydroxide aqueous solution. Thereafter, the mixture was subjected to thermal-vacuum distillation to remove unreacted monomer from the mixture and was then cooled to 30° C. or lower to yield a water dispersion containing the desired binder for a negative electrode.

<Production of Slurry Composition for Negative Electrode>

After mixing 100 parts of artificial graphite (volume-average particle diameter: 15.6 μm) and 1 part in terms of solid content of a 2% aqueous solution of carboxymethyl cellulose sodium salt (MAC350HC produced by Nippon Paper Industries Co., Ltd.) as a thickener, deionized water was further added to adjust the solid content concentration thereof to 68%, and then mixing was performed at 25° C. for 60 minutes. A mixture obtained in this manner was adjusted to a solid content concentration of 62% through addition of deionized water and was further mixed at 25°C for 15 minutes. Next, 1.5 parts in terms of solid content of the water dispersion containing the binder for a negative electrode was added to the mixture, deionized water was added to adjust the final solid content concentration to 52%, and a further 10 minutes of mixing was performed. The resultant mixture was subjected to a defoaming process under reduced pressure to yield a slurry composition for a negative electrode having good fluidity.

<Production of Negative Electrode>

The slurry composition for a negative electrode was applied onto copper foil of 20 μm in thickness serving as a current collector by a comma coater such as to have a thickness after drying of approximately 150 μm. The slurry composition was then dried by conveying the copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a post-pressing negative electrode having a negative electrode active material layer thickness of 80 μm.

<Production of Slurry Composition for Positive Electrode>

A slurry composition for a positive electrode was obtained by mixing 100 parts of $LiCoO_2$ having a volume-average particle diameter of 12 μm as a positive electrode active material, 2 parts of acetylene black (produced by Denka Company Limited; product name: HS-100) as a conductive material, and 2 parts in terms of solid content of polyvinylidene fluoride (produced by Kureha Corporation; product name: #7208) as a binder for a positive electrode, adjusting these materials to a total solid content concentration of 70% through addition of N-methylpyrrolidone, and then mixing these materials in a planetary mixer.

<Production of Positive Electrode>

The slurry composition for a positive electrode was applied onto aluminum foil of 20 μm in thickness serving as a current collector by a comma coater such as to have a thickness after drying of approximately 150 μm. The slurry composition was then dried by conveying the aluminum foil inside a 60° C. oven for 2 minutes at a speed of 0.5 m/min. Thereafter, 2 minutes of heat treatment was performed at 120° C. to obtain a pre-pressing positive electrode web. The pre-pressing positive electrode web was rolled by roll pressing to obtain a positive electrode.

<Production of Secondary Battery>

The post-pressing positive electrode was cut out as 49×5 $cm^2$. The separator was cut out as 55×5.5 $cm^2$ and was arranged on the positive electrode active material layer of the positive electrode that had been cut out. In addition, the post-pressing negative electrode was cut out as a 50×5.2 $cm^2$ rectangle and was arranged at the opposite side of the separator to the positive electrode with the surface at the negative electrode active material layer side thereof facing toward the separator. The resultant product was wound by a winding machine to obtain a roll. The roll was pressed into a flat form at 60° C. and 0.5 MPa. The flattened roll was then enclosed in an aluminum packing case serving as a battery case, and electrolyte solution (solvent: EC/DEC/VC=68.5/30/1.5 volume ratio; electrolyte: 1 M LiPF$_6$) was injected such that no air remained. The aluminum case was then closed by heat sealing at 150° C. in order to tightly seal an opening of the aluminum packing. In this manner, an 800 mAh wound lithium ion secondary battery was produced. The cycle characteristics of the lithium ion secondary battery obtained in this manner were evaluated by the previously described method.

Results of the various measurements and evaluations mentioned above are shown in Table 1.

Example 2

Various operations, measurements, and evaluations were performed in the same way as in Example 1 with the exception that the hydrocarbon having a molecular weight of 1,000 or less was changed to MORESCO® WHITE P-60 (produced by MORESCO® Corporation; molecular weight: 300), which is a chain saturated hydrocarbon, in "Production of slurry composition for non-aqueous secondary battery adhesive layer". The results are shown in Table 1.

Example 3

Various operations, measurements, and evaluations were performed in the same way as in Example 1 with the exception that the hydrocarbon having a molecular weight of 1,000 or less was changed to octane (molecular weight: 114), which is a chain saturated hydrocarbon, in "Production of slurry composition for non-aqueous secondary battery adhesive layer". The results are shown in Table 1.

Example 4

Various operations, measurements, and evaluations were performed in the same way as in Example 1 with the exception that the amount of the hydrocarbon having a molecular weight of 1,000 or less was changed as shown in Table 1 in "Production of slurry composition for non-aqueous secondary battery adhesive layer". The results are shown in Table 1.

Example 5

Various operations, measurements, and evaluations were performed in the same way as in Example 1 with the exception that the amount of sodium dioctyl sulfosuccinate was changed as shown in Table 1 in "Production of slurry composition for non-aqueous secondary battery adhesive layer". The results are shown in Table 1.

Example 6

Various operations, measurements, and evaluations were performed in the same way as in Example 1 with the exception that the amount of sodium dioctyl sulfosuccinate was changed as shown in Table 1 in "Production of slurry composition for non-aqueous secondary battery adhesive layer". The results are shown in Table 1.

Example 7

Various operations, measurements, and evaluations were performed in the same way as in Example 1 with the exception that the amount of sodium dioctyl sulfosuccinate was changed as shown in Table 1 in "Production of slurry composition for non-aqueous secondary battery adhesive layer". The results are shown in Table 1.

Comparative Example 1

Various operations, measurements, and evaluations were performed in the same way as in Example 1 with the exception that a sulfosuccinic acid ester or salt thereof was not used in "Production of slurry composition for non-aqueous secondary battery adhesive layer". The results are shown in Table 1.

Comparative Example 2

Various operations, measurements, and evaluations were performed in the same way as in Example 1 with the exception that a hydrocarbon having a molecular weight of 1,000 or less was not used in "Production of slurry composition for non-aqueous secondary battery adhesive layer". The results are shown in Table 1.

Comparative Example 3

Various operations, measurements, and evaluations were performed in the same way as in Example 1 with the exception that 0.1 parts of a hydrocarbon having a molecular weight of more than 1,000 (EXCEREX® 15341PA (EXCEREX® is a registered trademark in Japan, other countries, or both) produced by Mitsui Chemicals, Inc.; molecular weight: 1,320) was used instead of a hydrocarbon having a molecular weight of 1,000 or less in "Production of slurry composition for non-aqueous secondary battery adhesive layer". The results are shown in Table 1.

Comparative Example 4

Various operations, measurements, and evaluations were performed in the same way as in Example 1 with the exception that a hydrocarbon having a molecular weight of 1,000 or less and a sulfosuccinic acid ester or salt thereof were not used in "Production of slurry composition for non-aqueous secondary battery adhesive layer". The results are shown in Table 1.

In Table 1:

TABLE 1

| | | | | Examples | | | | | | |
|---|---|---|---|---|---|---|---|---|---|---|
| | | | | 1 | 2 | 3 | 4 | 5 | 6 | 7 |
| Slurry composition for adhesive | Organic particles | Structure | | Core-shell | | | | | | |
| | | Degree of swelling (%) | | 500 | | | | | | |
| | | Core portion | Chemical composition | MMA/BA/MAA/AMA = 53/45/1/1 | | | | | | |
| | | | Glass-transition temperature (° C.) | 45 | | | | | | |

TABLE 1-continued

|  |  |  | Examples | | | | | | |
|---|---|---|---|---|---|---|---|---|---|
|  |  |  | 1 | 2 | 3 | 4 | 5 | 6 | 7 |
| layer | Shell portion | Chemical composition | ST/MAA = 99/1 | | | | | | |
|  |  | Glass-transition temperature (° C.) | 107 | | | | | | |
|  |  | Amount (parts) | 100 | 100 | 100 | 100 | 100 | 100 | 100 |
|  | Sulfo-succinic acid ester or salt thereof | Type | Sodium dioctyl sulfosuccinate | | | | | | |
|  |  | Alkyl group structure | Linear | | | | | | |
|  |  | Additive amount (based on organic particles; parts) | 10 | 10 | 10 | 10 | 1 | 15 | 8 |
|  |  | Additive amount (based on 100 parts of hydrocarbon; parts) | 10000 | 10000 | 10000 | 1000 | 1000 | 15000 | 8000 |
|  | Hydro-carbon | Type | Chain saturated | Chain saturated | Chain saturated | Chain saturated | Chain saturated | Chain saturated | Chain saturated |
|  |  | Number-average molecular weight | 483 | 300 | 114 | 483 | 483 | 483 | 483 |
|  |  | Amount (based on organic particles; parts) | 0.1 | 0.1 | 0.1 | 1 | 0.1 | 0.1 | 0.1 |
|  | Binder | Chemical composition | 2EHA/ST/AA/AMA = 65/30/4/1 | | | | | | |
|  |  | Amount (based on organic particles; parts) | 15 | 15 | 15 | 15 | 15 | 15 | 15 |
|  | Leveling agent | Chemical composition | Polyoxyalkylene alkyl aryl ether surfactant | | | | | | |
|  |  | Amount (based on organic particles; parts) | 0.15 | | | | | | |
|  |  | Slurry surface tension (mN/m) | 34 | 34 | 34 | 34 | 38 | 32 | 35 |
| Separator substrate | | Material | Polyethylene | | | | | | |
|  | | Thickness (μm) | 7 | | | | | | |
|  | | Porosity (%) | 48 | | | | | | |
| Evaluation | | Voltage resistance | A | A | B | A | B | A | A |
|  | | Cycle characteristics | A | A | A | A | A | B | A |
|  | | Process adhesiveness | A | A | A | B | A | A | A |

|  |  |  |  | Comparative examples | | | |
|---|---|---|---|---|---|---|---|
|  |  |  |  | 1 | 2 | 3 | 4 |
| Slurry composition for adhesive layer | Organic particles | Structure | | Core-shell | | | |
|  |  | Degree of swelling (%) | | 500 | | | |
|  |  | Core portion | Chemical composition | MMA/BA/MAA/AMA = 53/45/1/1 | | | |
|  |  |  | Glass-transition temperature (° C.) | 45 | | | |
|  |  | Shell portion | Chemical composition | ST/MAA = 99/1 | | | |
|  |  |  | Glass-transition temperature (° C.) | 107 | | | |
|  |  |  | Amount (parts) | 100 | 100 | 100 | 100 |
|  | Sulfo-succinic acid ester or salt thereof | Type | | — | Sodium dioctyl sulfosuccinate | Sodium dioctyl sulfosuccinate | — |
|  |  | Alkyl group structure | | — | Linear | Linear | — |
|  |  | Additive amount (based on organic particles; parts) | | 0 | 10 | 10 | 0 |
|  |  | Additive amount (based on 100 parts of hydrocarbon; parts) | | 0 | — | 10000 | — |
|  | Hydro-carbon | Type | | Chain saturated | — | Chain saturated | — |
|  |  | Number-average molecular weight | | 483 | — | 1320 | — |
|  |  | Amount (based on organic particles; parts) | | 0.1 | 0 | 0.1 | 0 |
|  | Binder | Chemical composition | | 2EHA/ST/AA/AMA = 65/30/4/1 | | | |
|  |  | Amount (based on organic particles; parts) | | 15 | 15 | 15 | 15 |
|  | Leveling agent | Chemical composition | | Polyoxyalkylene alkyl aryl ether surfactant | | | |
|  |  | Amount (based on organic particles; parts) | | 0.15 | | | |
|  |  | Slurry surface tension (mN/m) | | 50 | 34 | 34 | 50 |
| Separator substrate | | Material | | Polyethylene | | | |
|  | | Thickness (μm) | | 7 | | | |

TABLE 1-continued

| | | Examples | | | | | | |
|---|---|---|---|---|---|---|---|---|
| | | 1 | 2 | 3 | 4 | 5 | 6 | 7 |
| Evaluation | Porosity (%) | | | | | 48 | | |
| | Voltage resistance | | | | C | C | C | C |
| | Cycle characteristics | | | | A | A | C | B |
| | Process adhesiveness | | | | A | C | C | C |

"MMA" indicates methyl methacrylate;
"BA" indicates butyl acrylate;
"MAA" indicates methacrylic acid;
"AMA" indicates allyl methacrylate;
"ST" indicates styrene;
"2EHA" indicates 2-ethylhexyl acrylate; and
"AA" indicates acrylic acid.

It can be seen from Examples 1 to 7 in Table 1 that separators formed using a slurry composition for a non-aqueous secondary battery adhesive layer that contained organic particles, a sulfosuccinic acid ester or a salt thereof, a hydrocarbon having a molecular weight of 1,000 or less, and water had excellent voltage resistance. Moreover, it can be seen from Comparative Examples 1 to 4 that separators formed using a slurry composition for a non-aqueous secondary battery adhesive layer that lacked any of the constituent components mentioned above all had poor voltage resistance compared to the examples.

INDUSTRIAL APPLICABILITY

According to the present disclosure, it is possible to provide a slurry composition for a non-aqueous secondary battery adhesive layer that can provide a separator having excellent voltage resistance when the slurry composition for a non-aqueous secondary battery adhesive layer is adopted for forming an adhesive layer on a separator substrate.

Moreover, according to the present disclosure, it is possible to provide an adhesive layer for a non-aqueous secondary battery that can improve voltage resistance of a separator.

Furthermore, according to the present disclosure, it is possible to provide a separator for a non-aqueous secondary battery and a non-aqueous secondary battery that have excellent voltage resistance.

The invention claimed is:

1. A slurry composition for a non-aqueous secondary battery adhesive layer comprising: organic particles; a sulfosuccinic acid ester or a salt thereof; a chain saturated hydrocarbon having a molecular weight of 200 or more and 1,000 or less; a binder; a leveling agent; and water, wherein proportional content of the sulfosuccinic acid ester or the salt thereof is not less than 8 parts by mass and not more than 18 parts by mass per 100 parts by mass of the organic particles, each of the organic particles has a core-shell structure,
the sulfosuccinic acid ester is dioctyl sulfosuccinic acid,
the binder is an acrylic polymer, and
the leveling agent is a non-ionic surfactant.

2. The slurry composition for a non-aqueous secondary battery adhesive layer according to claim 1, wherein proportional content of the sulfosuccinic acid ester or the salt thereof is not less than 500 parts by mass and not more than 20,000 parts by mass per 100 parts by mass of the hydrocarbon.

3. The slurry composition for a non-aqueous secondary battery adhesive layer according to claim 1, wherein proportional content of the chain saturated hydrocarbon is not less than 0.01 parts by mass and not more than 1 part by mass per 100 parts by mass of the organic particles.

4. A method of producing an adhesive layer for a non-aqueous secondary battery comprising:
applying the slurry composition for a non-aqueous secondary battery adhesive layer according to claim 1 onto a separator substrate to form a coating film; and
drying the coating film to obtain an adhesive layer.

5. An adhesive layer for a non-aqueous secondary battery formed using the slurry composition for a non-aqueous secondary battery adhesive layer according to claim 1.

6. A separator for a non-aqueous secondary battery comprising the adhesive layer for a non-aqueous secondary battery according to claim 5.

7. A non-aqueous secondary battery comprising the adhesive layer for a non-aqueous secondary battery according to claim 5.

* * * * *